US008086361B2

(12) United States Patent
Conner et al.

(10) Patent No.: US 8,086,361 B2
(45) Date of Patent: Dec. 27, 2011

(54) ADVISORY SYSTEM TO AID PILOT RECOVERY FROM SPATIAL DISORIENTATION DURING AN EXCESSIVE ROLL

(75) Inventors: Kevin J Conner, Kent, WA (US); Thea L. Feyereisen, Hudson, WI (US)

(73) Assignee: Honeywell International Inc., Morristown, NJ (US)

( * ) Notice: Subject to any disclaimer, the term of this patent is extended or adjusted under 35 U.S.C. 154(b) by 1048 days.

(21) Appl. No.: 11/955,095

(22) Filed: Dec. 12, 2007

(65) Prior Publication Data

US 2009/0157240 A1 Jun. 18, 2009

(51) Int. Cl.
*G01C 23/00* (2006.01)

(52) U.S. Cl. ............... 701/9; 701/4; 340/970; 340/975

(58) Field of Classification Search .......... 340/970, 340/975; 701/4, 9
See application file for complete search history.

(56) References Cited

U.S. PATENT DOCUMENTS

| 4,939,513 A * | 7/1990 | Paterson et al. ............ 340/970 |
| 5,798,713 A * | 8/1998 | Viebahn et al. ............. 340/974 |
| 6,002,347 A | 12/1999 | Daly et al. |
| 6,028,536 A * | 2/2000 | Voulgaris ................. 340/975 |
| 6,127,944 A | 10/2000 | Daly et al. |
| 6,341,248 B1 * | 1/2002 | Johnson ...................... 701/4 |
| 6,567,014 B1 * | 5/2003 | Hansen et al. ............. 340/980 |
| 7,088,264 B2 * | 8/2006 | Riley ........................ 340/963 |
| 2001/0039466 A1 * | 11/2001 | Katz et al. .................. 701/4 |

* cited by examiner

*Primary Examiner* — Khoi Tran
*Assistant Examiner* — Stephen Holwerda
(74) *Attorney, Agent, or Firm* — Lowe Graham Jones PLLC

(57) ABSTRACT

Systems and methods for outputting instructions when a vehicle is not responding to a roll-angle alert. An example system includes one or more altitude sensors that determine one of altitude above ground level or barometric altitude, one or more roll-angle sensors that determine the roll-angle of the vehicle, and a processor. The processor receives the altitude and roll-angle information, determines if an excessive roll-angle condition exists based on the received altitude and roll-angle information, and generates a roll-angle alert signal if a roll-angle alert condition exists. The processor generates a roll-direction signal based upon vehicle position relative to the horizon and outputs the determined roll-direction signal via the one or more output devices, if one of the condition still exists after the time delay, the vehicle roll-angle has deteriorated away from the desired threshold, or the roll-angle rate is greater than a roll-angle rate threshold.

14 Claims, 3 Drawing Sheets

ADVISORY SYSTEM TO AID PILOT RECOVERY FROM SPATIAL DISORIENTATION DURING AN EXCESSIVE ROLL

BACKGROUND OF THE INVENTION

Recovery from an excessive aircraft roll condition can be hampered by the pilot inverting the required recovery control inputs. This can lead to an upset incident or accident. Present aircraft instruments do not seem to provide enough information to cause the pilot to reverse an incorrectly entered control input.

SUMMARY OF THE INVENTION

The present invention provides systems and methods for outputting instructions when a vehicle is not responding to an excessive roll-angle alert. An example system includes one or more altitude sensors that determine one of altitude above ground level or barometric altitude, one or more roll-angle sensors that determine the roll-angle of the vehicle, and a processor. The processor receives the altitude and roll-angle information, determines if an excessive roll-angle condition exists based on the received altitude and roll-angle information, and generates a roll-angle alert signal if a roll-angle alert condition exists. One or more output devices output one or more of an audio or video signal indicating an alert condition exists if the processor generated the roll-angle alert signal. The processor determines if the alert condition still exists after one of a predefined period of time, the vehicle roll-angle is deteriorating away from a desired threshold, or vehicle roll-angle rate is greater than a roll-angle rate threshold. If one of the condition still exists after the time delay, the vehicle roll-angle has deteriorated away from the desired threshold, or the roll-angle rate is greater than a roll-angle rate threshold, the processor generates a roll-direction signal based upon vehicle position relative to the horizon and outputs the determined roll-direction signal via the one or more output devices.

In one aspect of the present invention, the roll-angle signal and the roll-direction signal include one or more of a synthesized or pre-recorded voice, for example "bank angle," "roll left," or "roll right."

In another aspect of the present invention, the roll-direction signal includes one or more of graphical or textual information. The graphical information includes an arrow pointing in the direction to roll the vehicle to attain level flight. The textual information includes the text "roll left" or "roll right."

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
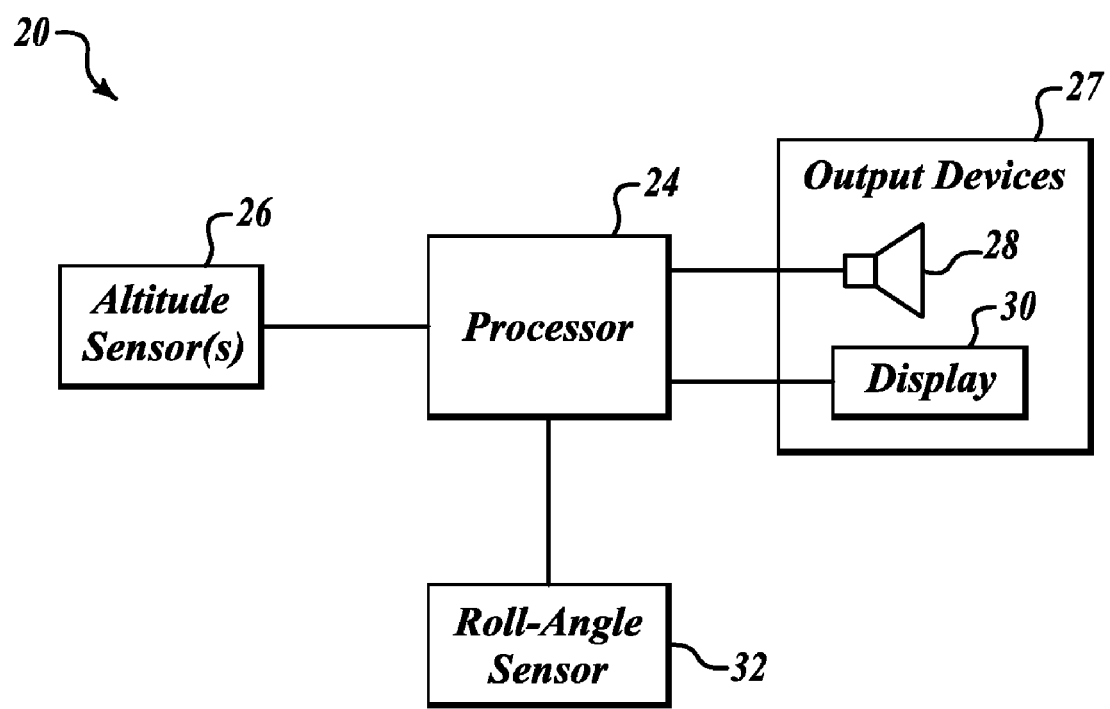
FIG. 1 illustrates a schematic diagram of an example system formed in accordance with an embodiment of the present invention.

FIG. 1 illustrates a schematic diagram of an example system 20 for performing processes in accordance with embodiments of the present invention. The example system 20 includes a processing device 24 that is in signal communication with altitude sensor(s) 26, a roll-angle sensor 32, and output devices 27, such as speakers 28 and displays 30. The processing device 24 receives altitude information from the altitude sensor(s) 26 and vehicle roll-angle information and/or roll-angle rate information from the roll-angle sensor 32. The processing device 24 determines if a roll-alert condition exists and outputs a roll-alert signal via the output devices 27 based on the received altitude information, the roll-angle information and/or the roll-angle rate information.

The system 20 may be incorporated into any of a number of different types of vehicles, such as aircraft or submarines. The present invention may be embodied in software and/or hardware that is included in an existing system located on the vehicle, such as a terrain awareness system (TAWS). The altitude sensor(s) 26 may be any one of or combination of existing altitude sensors, for example barometric altimeter, global positioning systems (GPS), radar altimeter (RADALT), or a geometric altitude calculated from information from the other types of altitude sensors. The roll-angle and roll-angle rate are provided by an air data computer (ADC) or separate gyroscopes. The speakers 28 and displays 30 may be existing vehicle equipment.

Figure 2:
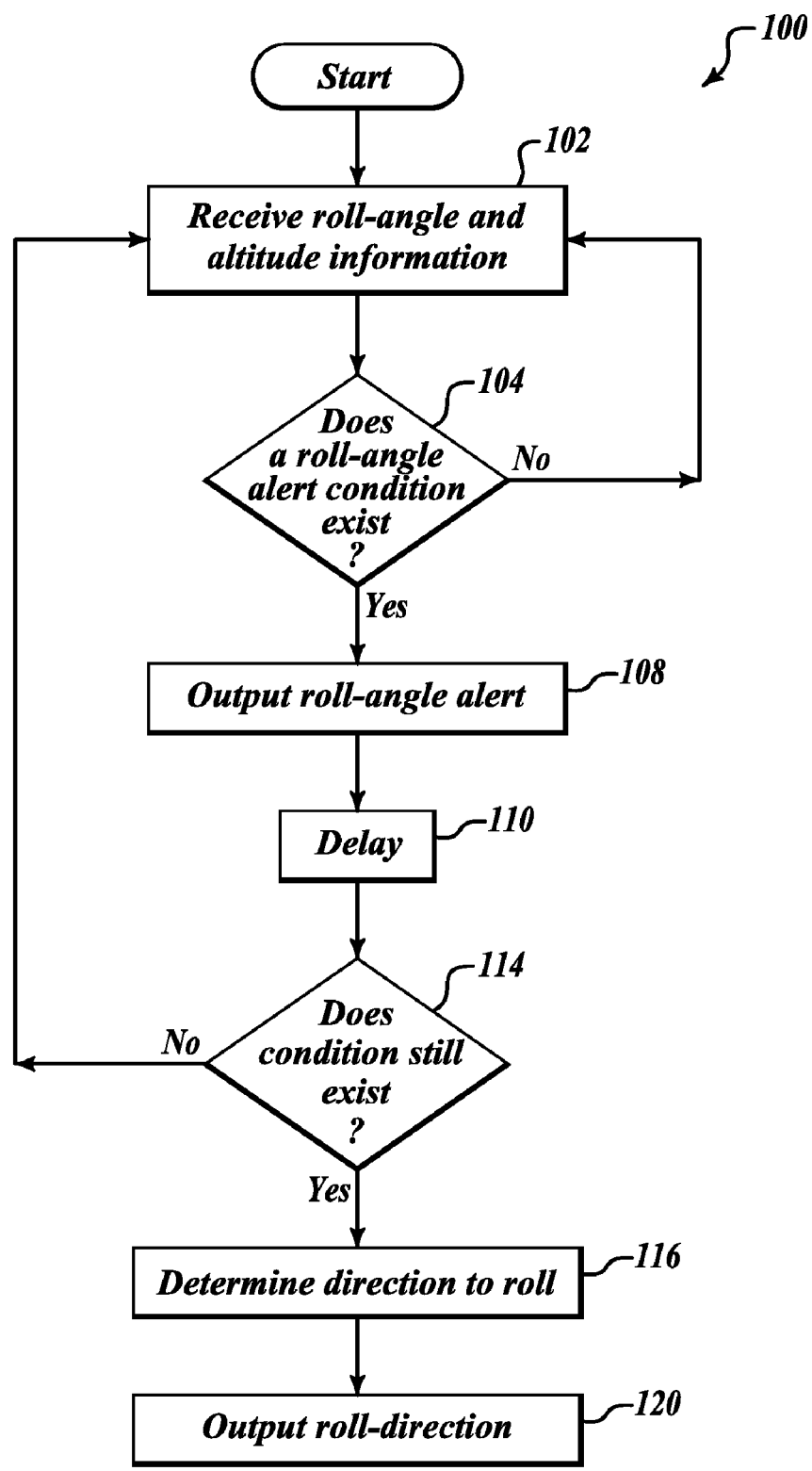
FIG. 2 is a flow diagram of an example process performed by the systems shown in FIG. 1.

FIG. 2 illustrates an example process 100 that is performed by the system 20 shown in FIG. 1. First at a block 102, the processing device 24 receives roll-angle information from the roll-angle sensor 32 and altitude information from the altitude sensor(s) 26. Next, at a decision block 104, the processing device 24 determines if an excessive roll-angle alert condition exists based on the received roll-angle and altitude information.

Figure 3:
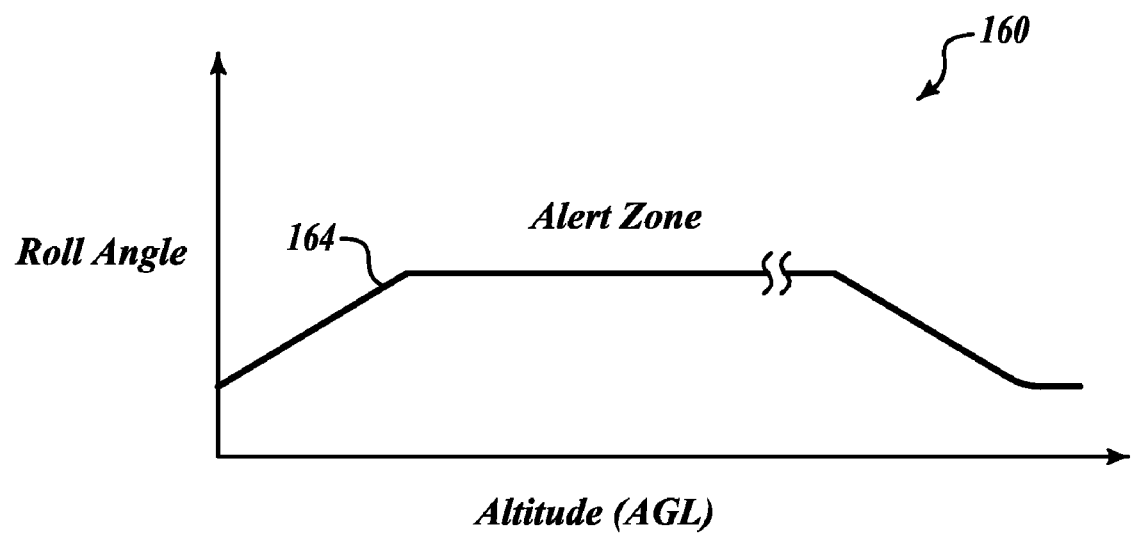
FIG. 3 is a graph illustrating example roll-angle limits versus altitude graph used as a limit by the process shown in FIG. 2.

FIG. 3 shows a graph 160 of an example roll-angle threshold curve 164 that varies depending upon altitude above ground level (AGL). In one embodiment, AGL below a predefined altitude is determined by the RADALT. Above the predefined altitude, altitude is determined by a barometric altimeter. If the processing device 24 does not determine that roll-angle alert condition exists (e.g., roll-angle values below the roll-angle threshold curve 164 (not in the alert zone)), then the process 100 returns to the beginning. However, if the processing device 24 does determine that a roll-angle alert condition exists, then at a block 108, the processing device 24 generates a roll-angle alert signal, sends it to one or more of the output devices 27 for presentation to the flight crew. In one embodiment the output signal that is generated is either a synthesized voice or prerecorded voice that includes the phrase "bank-angle." The output signal is then outputted by the speaker 28, such as pilot head phones.

Next, at a block 110, a predefined delay is applied. Then, at a decision block 114, the processing device 24 determines if the roll-angle alert condition still exists after the delay. If at the decision block 114, the roll-angle alert condition was determined not to exist anymore, then the process 100 returns to the start. However, if the processing device 24 does determine that the condition still exists then, at a block 116, the processing device 24 determines the direction that the aircraft needs to roll in order to exit the roll-angle alert condition based on the roll-angle. At a block 120, the processing device 24 generates a roll-direction signal based on the determined direction that the vehicle needs to roll. An audio and/or visual signal is outputted by the output devices 27 based on the generated roll-direction signal.

In one embodiment, the roll-direction signal is a voice signal similar to that which was generated in block 108 except that the voice signal would be instructions to the pilot on which way to roll the vehicle, e.g., "roll left"; "roll right". The processing device 24 selects the audio or visual signal that, if properly responded to by the pilot of the vehicle, would result in the least amount of roll in order to get the vehicle back to level flight. In another embodiment, the processing device 24 produces display information that is sent to one or more of the displays 30. For example, a direction arrow with or without text may pop up on the vehicle's multi-function displays, heads-up display or may be outputted in the form of predesignated lights or roll indicators.

In another embodiment, the processing device 24 may be configured to process the functions performed at blocks 116 and 120 if the vehicle roll-angle received by the processing device 24 shows that the vehicle is continuing to roll in a direction that puts it further into the alert zone or the roll-angle rate is greater than a predefined threshold (see FIG. 3). This may be performed immediately after the roll-angle alert is outputted at block 108. In a situation such as this, the processing device 24 determines that the pilot might be reacting incorrectly to the alert presented at block 108. When this occurs then the processing device 24 generates a "roll left" or "roll right" alert without delay and outputs it to the pilot.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system for outputting instructions when a vehicle is not responding to a roll-angle alert, the system comprising:
   one or more altitude sensors configured to determine one of altitude above ground level or barometric altitude;
   one or more roll-angle sensors configured to determine roll-angle of the vehicle;
   a processor configured to
      receive the altitude and roll-angle information,
      determine if a roll-angle alert condition exists based on the received altitude and roll-angle information, and
      generate a roll-angle alert signal if the roll-angle alert condition exists; and
   one or more output devices configured to output one or more of an audio or video signal if the processor generated the roll-angle alert signal,
   wherein the processor is further configured to
      determine if the roll-angle alert condition still exists after one of a predefined period of time, the vehicle roll-angle is deteriorating away from a desired threshold, or vehicle roll-angle rate is greater than a roll-angle rate threshold,
      generate a roll-direction signal based upon vehicle position relative to the horizon, if one of the roll-angle alert condition still exists after the predefined period of time, the vehicle roll-angle has deteriorated away from the desired threshold, or the roll-angle rate is greater than the roll-angle rate threshold, respectively, and
      output the determined roll-direction signal via the one or more output devices.

2. The system of claim 1, wherein the roll-angle alert signal and the roll-direction signal include one or more of a synthesized or pre-recorded voice.

3. The system of claim 2, wherein the roll-angle alert signal includes the spoken phrase "bank angle."

4. The system of claim 2, wherein the roll-direction signal includes at least one of the spoken phrases "roll left" or "roll right."

5. The system of claim 1, wherein the roll-direction signal includes one or more of graphical or textual information.

6. The system of claim 1, wherein the roll-direction signal includes graphical information, wherein the vehicle is an aircraft, and wherein the graphical information includes an arrow pointing in the direction to roll the aircraft to attain level flight.

7. The system of claim 1, wherein the roll-direction signal includes textual information, wherein the textual information includes the text "roll left" or "roll right."

8. A method for outputting instructions when a vehicle is not responding to a roll-angle alert, the method comprising:
   determining one of altitude above ground level or barometric altitude;
   determining roll-angle of the vehicle;
   determining if a roll-angle alert condition exists based on the received altitude and roll-angle information;
   generating a roll-angle alert signal if the roll-angle alert condition exists;
   outputting one or more of an audio or video signal if the roll-angle alert signal was generated;
   determining if the roll-angle alert condition still exists after one of a predefined period of time, the vehicle roll-angle is deteriorating away from a desired threshold, or vehicle roll-angle rate is greater than a roll-angle rate threshold;
   generating a roll-direction signal based upon vehicle position relative to the horizon, if one of the roll-angle alert condition still exists after the predefined period of time, the vehicle roll-angle has deteriorated away from the desired threshold, or the roll-angle rate is greater than the roll-angle rate threshold, respectively; and
   outputting the determined roll-direction signal via one or more output devices.

9. The method of claim 8, wherein the roll-angle signal and the roll-direction signal include one or more of a synthesized or pre-recorded voice.

10. The method of claim 9, wherein the roll-angle alert signal includes the spoken phrase "bank angle."

11. The method of claim 9, wherein the roll-direction signal includes at least one of the spoken phrases "roll left" or "roll right."

12. The method of claim 8, wherein the roll-direction signal includes one or more of graphical or textual information.

13. The method of claim 8, wherein the roll-direction signal includes graphical information, wherein the vehicle is an aircraft and wherein the graphical information includes an arrow pointing in the direction to roll the aircraft to attain level flight.

14. The method of claim 8, wherein the roll-direction signal includes textual information, wherein the textual information includes the text "roll left" or "roll right."

* * * * *